United States Patent [19]

Burkey et al.

[11] 4,221,758

[45] Sep. 9, 1980

[54] METHOD OF EMBOSSING WOOD GRAIN PATTERNS

[75] Inventors: David J. Burkey, Millersville; Lawrence Clark, Lancaster, both of Pa.

[73] Assignee: Armstrong Cork Company, Lancaster, Pa.

[21] Appl. No.: 938,823

[22] Filed: Sep. 1, 1978

[51] Int. Cl.$^2$ .................. B29C 17/00; B29C 1/02
[52] U.S. Cl. ................................ 264/225; 264/293
[58] Field of Search ............... 264/293, 284, 134, 225

[56] References Cited

U.S. PATENT DOCUMENTS

| | | | |
|---|---|---|---|
| 1,337,802 | 4/1920 | Somerville | 264/293 |
| 1,422,695 | 7/1922 | Goldenbaum | 264/293 |
| 2,431,720 | 12/1947 | Willey | 264/293 |
| 3,507,733 | 4/1970 | Davidson | 264/284 |
| 3,535,211 | 10/1970 | Frowde | 204/22 |
| 3,594,457 | 7/1971 | Wright | 264/293 |
| 3,869,535 | 3/1975 | Coll-Palagos | 264/219 |
| 3,883,632 | 5/1975 | Petrochko | 264/293 |
| 3,996,328 | 12/1976 | Coffin et al. | 264/284 |

*Primary Examiner*—James B. Lowe

[57] ABSTRACT

The invention is directed to a method of embossing wood grain patterns on fiberboard surfaces. A Mylar sheet is placed between the embossing plate and the coated fiberboard. The Mylar sheet prevents removal of the coating from the fiberboard and still permits good detail for fine embossing.

1 Claim, No Drawings

METHOD OF EMBOSSING WOOD GRAIN PATTERNS

BACKGROUND OF THE INVENTION

1. Field of the Invention

The invention is directed to an embossing technique and, more particularly, to a technique for embossing a wood grain pattern on a fiberboard surface.

2. Description of the Prior Art

U.S. Pat. No. 3,535,211 teaches the use of an embossing means made by electroforming nickel on a silicone elastomer.

U.S. Pat. No. 3,869,535 indicates that wood can be embossed by an engraving roll which has sharpness of features due to the electroplating of the embossing means.

SUMMARY OF THE INVENTION

The invention is directed to a method of embossing a coated wood composition board (particleboard or fiberboard). The embossing plate contains embossing lands 1-125 mils in width and 1-90 mils in height above the embossing plate valleys. A Mylar sheet with a thickness of 0.5-1.5 mils is placed between the fiberboard surface to be embossed and the embossing plate. The presence of the Mylar film prevents the base coat on the surface of the fiberboard from being separated from the board and transferred to the embossing plate, resulting in a rough, poorly finished board and a contaminated embossing plate.

DESCRIPTION OF THE PREFERRED EMBODIMENT

Through an embossing technique, wood fiber surfaces which have no grain or very little grain can be embossed with the grain of an expensive wood so that they now take on the appearance of being the expensive wood. When a wood grain effect is being embossed, it is necessary that sharp, distinct projections are used on the embossing plate to achieve a wood-like appearance. Consequently, the embossing plate is formed by making silicone rubber castings of selected wood panels and then generating the embossing plate therefrom by conventional means through an electroforming process. This electroforming process deposits molecular nickel onto the silicone casting and produces an exact replica of the wood grain. The plate made by the electroform process has finer detail and a sharper grain than do plates made by conventional techniques. Plates can be made by other conventional processes.

Normally, the wood grain pattern is formed from a series of lines spaced as close as 10 mils apart, and these lines are only 1-10 mils deep in the surface being embossed. In order to secure the desired embossing, the embossing plate must be made with embossing lines of 1-10 mils in width and 1-10 mils in height above the embossing plate valleys. Normally, embossing is carried out at a temperature range of 300°-400° F. (150°-205° C.) but could be carried out at temperatures as high as 500° F. The embossing is carried out at relatively high pressures, and pressure is applied for anywhere from 1-15 seconds.

When embossing particleboard, which is a conventional wood fiber resin bonded material, the best image of the grain pattern is obtained by applying a finishing base coat to the polyester filled board before embossing. For example, embossing may be done on a conventional particleboard such as the 45 lbs. per cubic foot board sold by Bosie-Cascade Company. This board surface is somewhat porous and, therefore, is filled with a conventional polyester resin to provide the board with a relatively smooth surface. Over this is then applied what is called a finishing base coat which is nothing more than a paint, such as the catalyzed base coat 6351155 sold by Mobil.

If the embossing of a wood grain pattern had been done before applying the base coat, the fine grain embossing texture would be filled by the paint coat and, therefore, lost when the paint coat is applied. However, with the base coat applied before embossing, a problem occurs when embossing a base-coated particleboard at temperatures high enough, for example 300°-350° F., to get good embossing at reasonable pressures. For example, if the above board is embossed at 350° F. at a pressure of 1,500 pounds per square inch for 5 seconds, the base coat material will separate from the board and transfer to the embossing plate, causing a rough, poorly finished board and a contaminated embossing plate.

It has been found that the applying of a thin film of material, not affected by the high embossing temperatures, can be used between the embossing plate and the base-coated board to eliminate this pick off, with very little loss of detail in the embossing. To date, best results have been secured through the use of a 0.5 mil thick Mylar film. This film will be placed on top of the coated wood fiberboard just prior to embossing and will stay between the embossing plate and the surface being embossed during the embossing operation. It has been found that the Mylar film can be used in a thickness of 0.5-1.5 mils without substantially affecting the embossed image. It has been found that thin papers ranging from 1.5-2.5 mils will provide only fair reproductions of the embossed image, and these are easily torn or cut by the fine embossing pattern. Heavier papers ranging from 3-4 mils in thickness are more resistant to tearing than cutting, but they cut down heavily on the detail of the embossing. It has been found that the Mylar is particularly useful since it readily conforms to the embossing pattern without being cut, and yet provides good detail in the embossing. These films seem to have necessary satisfactory strength and elongation to resist tearing and cutting by all but the deepest embossing patterns. Even if some cutting of the Mylar does take place, the Mylar film does not cling to the embossing plate.

Mylar film now gives the best results secured to date. However, other plastic films such as acrylic or polycarbonate can be used.

What is claimed is:

1. A method of embossing a wood composition board surface having a paint coating thereon comprising the steps of:
   (a) forming a mirror image of the pattern to be embossed on a metal embossing plate, said pattern being a wood grain pattern with embossing lines of 1-10 mils in width and 1-10 mils in height above the embossing plate valleys;
   (b) embossing the surface of the paint coated wood composition board with the metal embossing plate, said plate being heated to about 300°-500° F., said embossing being done with a pressure of about 1,500 pounds per square inch applied for 1-5 seconds; and
   (c) the improvement comprising:

(1) positioning a plastic sheet with a thickness of 0.5–1.5 mils between said paint coated composition board surface to be embossed and said metal embossing plate during the embossing step, whereby the absence of the plastic sheet will result in the removal of some of the paint coating from the board surface when the embossing plate is removed from the board surface after embossing, and the presence of the plastic sheet prevents paint removal but still results in very little loss of grain detail in embossing the wood surface.

* * * * *